Aug. 8, 1939.  H. BRANDENBERGER  2,169,135
MACHINE TOOL WITH HYDRAULIC COPYING DEVICE
Filed July 2, 1938   6 Sheets-Sheet 1

Inventor
Heinrich Brandenberger
By Blinger, Atty.

Aug. 8, 1939.  H. BRANDENBERGER  2,169,135
MACHINE TOOL WITH HYDRAULIC COPYING DEVICE
Filed July 2, 1938  6 Sheets—Sheet 2

Inventor
Heinrich Brandenberger
By B. Linger, atty.

Aug. 8, 1939.  H. BRANDENBERGER  2,169,135
MACHINE TOOL WITH HYDRAULIC COPYING DEVICE
Filed July 2, 1938  6 Sheets-Sheet 3

Aug. 8, 1939.   H. BRANDENBERGER   2,169,135
MACHINE TOOL WITH HYDRAULIC COPYING DEVICE
Filed July 2, 1938   6 Sheets-Sheet 4
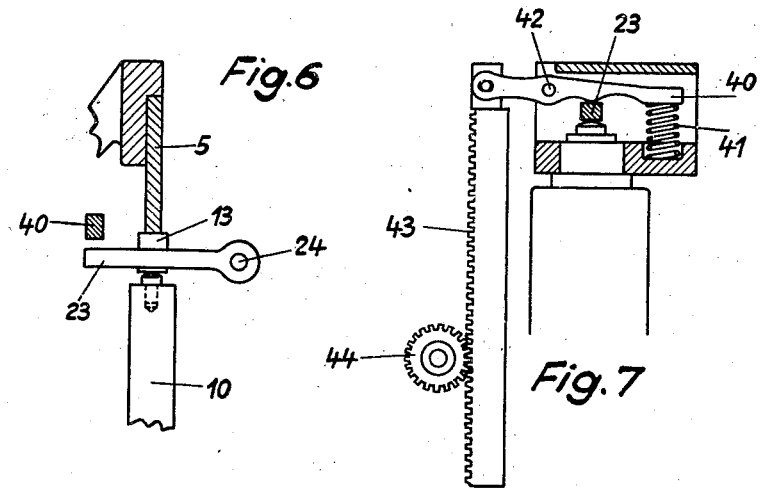
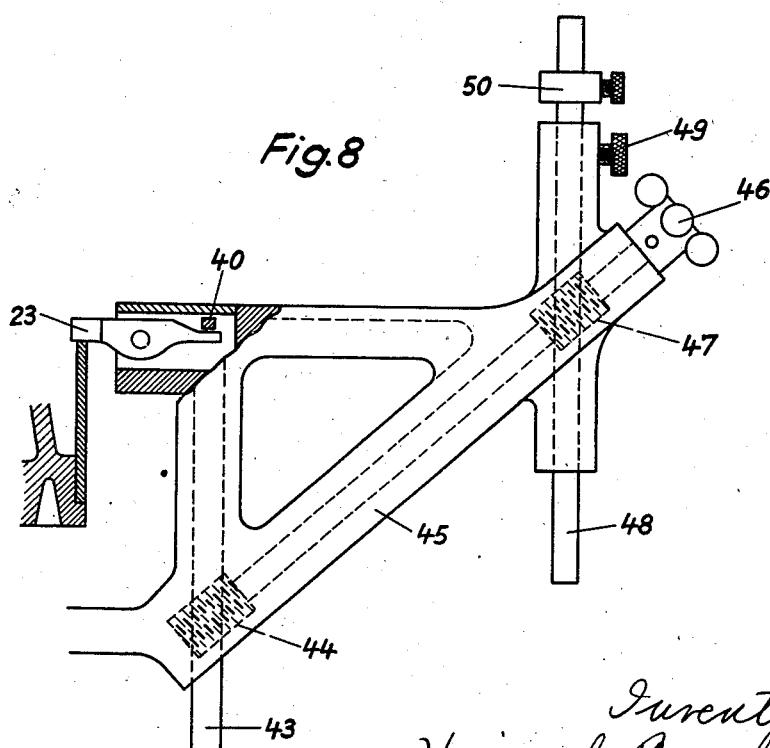
Inventor
Heinrich Brandenberger
By Bilinger, atty.

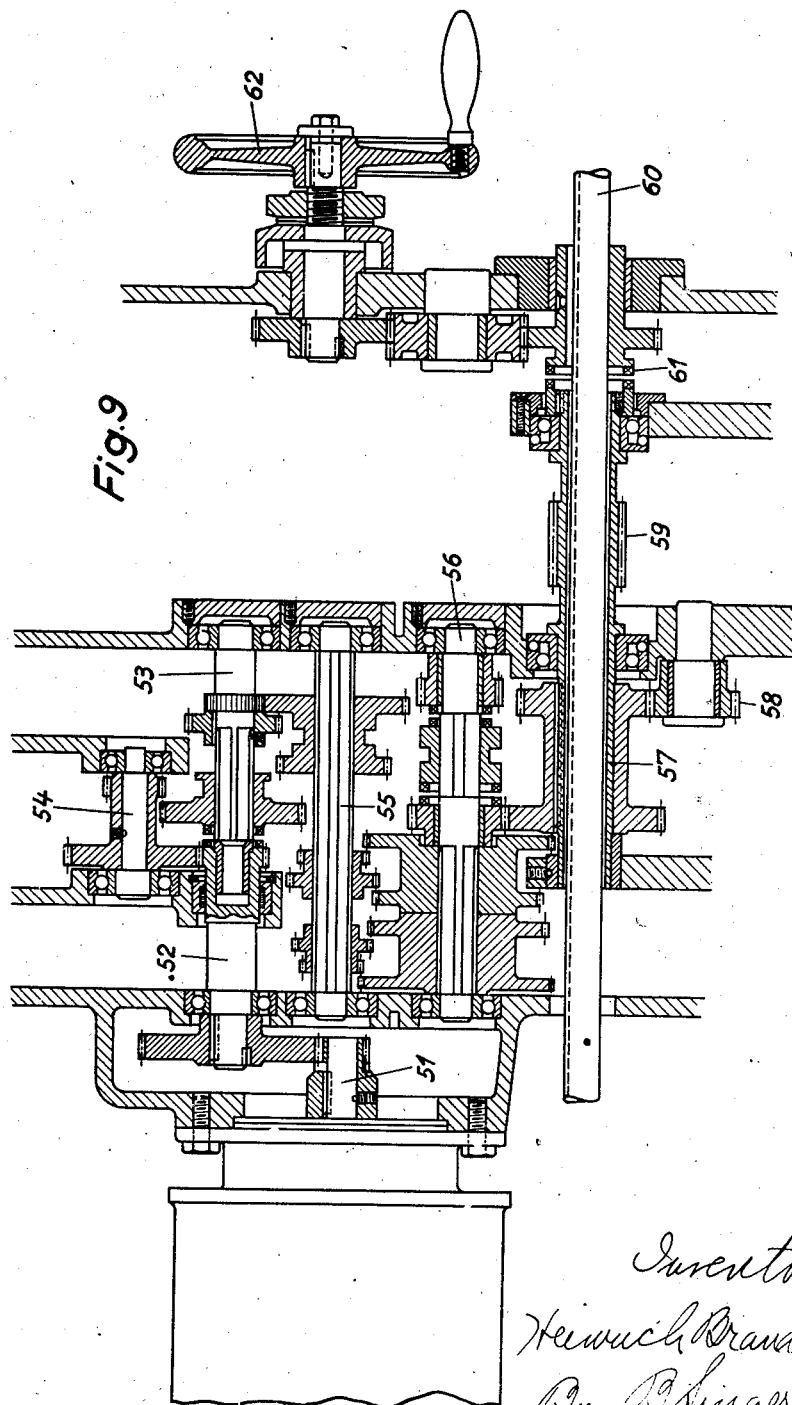

Aug. 8, 1939.  H. BRANDENBERGER  2,169,135
MACHINE TOOL WITH HYDRAULIC COPYING DEVICE
Filed July 2, 1938  6 Sheets-Sheet 6

Inventor
Heinrich Brandenberger
By B. Singer, Atty.

Patented Aug. 8, 1939

2,169,135

UNITED STATES PATENT OFFICE 2,169,135

MACHINE TOOL WITH HYDRAULIC COPYING DEVICE

Heinrich Brandenberger, Zurich, Switzerland

Application July 2, 1938, Serial No. 217,251
In Switzerland October 25, 1937

12 Claims. (Cl. 82—14)

The subject of the invention is a machine tool with a hydraulic copying device wherein a slide is actuated relatively to a stationary framework by means of a templet. Previous machine tools of this character operate in such a manner that the control member actuated by the templet partakes of the movement of the piston. The actuation of the piston in the cylinder, to which pressure medium is supplied continuously, must be effected through a transmission mechanism which leads to considerable inaccuracies, also in the arrangement it is necessary, for an additional movement of the actuated slide, for the purpose of adjusting it to the dimensions of the workpiece and to the applied force, to provide the structure with a screw spindle which enables the piston to be adjusted relatively to the copying slide.

A further disadvantage of existing machine tools with a hydraulic copying device resides therein that the templet is clamped on the actuated slide on a level with the tool, whilst the feeler pin projects beyond this on the other side of the framework. The templet is thus liable to be soiled by shavings from the machine tool. The template also interferes with the attending to the machine and by this arrangement also makes it necessary to construct the machine tool of large dimensions. With this arrangement it is also not possible to effect the mechanical valve adjustment directly from the drive of the actuated slide.

The invention relates to a machine tool with hydraulic copying device and a stationary work or a work which rotates about a stationary axis. In this machine tool a tool having a longitudinal movement is controlled by means of a templet or pattern with respect to the standard, the rod slidably actuated by the pattern or templet being moved against a valve which is stationary with respect to the standard during the copying operation. The valve, as seen from the work or from the point of operation, is located in the direction of the transverse control of the tool on the same side of the machine as the pattern or templet which is in motion, and has the piston with the cylinder through which the controlled transverse movement of the work is produced. As the rod moved by the templet is actuated relatively to a fixed valve, it is possible to adjust the slide additionally, independently of the templet, by varying the position of the valve. By arranging the templet and actuated valve on the same side of the machine it is possible to bring the templet out of reach of the tool and to mount the control members feeler pin, valve and piston, directly in close proximity to one another, whilst avoiding the use of long rods and long oil pipes. It is also possible to obtain the drive of the valve, which is stationary during copying, from the drive of the actuated slide, without it being necessary to use separate gears for this purpose. Further actuations, such as rapid adjustment and so forth, may also be carried out in combination with the actuated slide itself.

In order to economise in height the templet and the movable rod, leading to the valve, actuated thereby, are arranged side by side according to the invention. Further features of the invention will appear from the following description with reference to the accompanying drawings of an example of construction of a machine, constructed for example as a turning lathe.

In the accompanying drawings:

Fig. 6 shows a section of a part of a copying device.

Fig. 7 shows a lever by which the valve rod can be moved additionally for rapid adjustment.

Fig. 8 shows the mechanism of a rapid adjustment.

Fig. 9 shows a feed gear.

Figure 1:
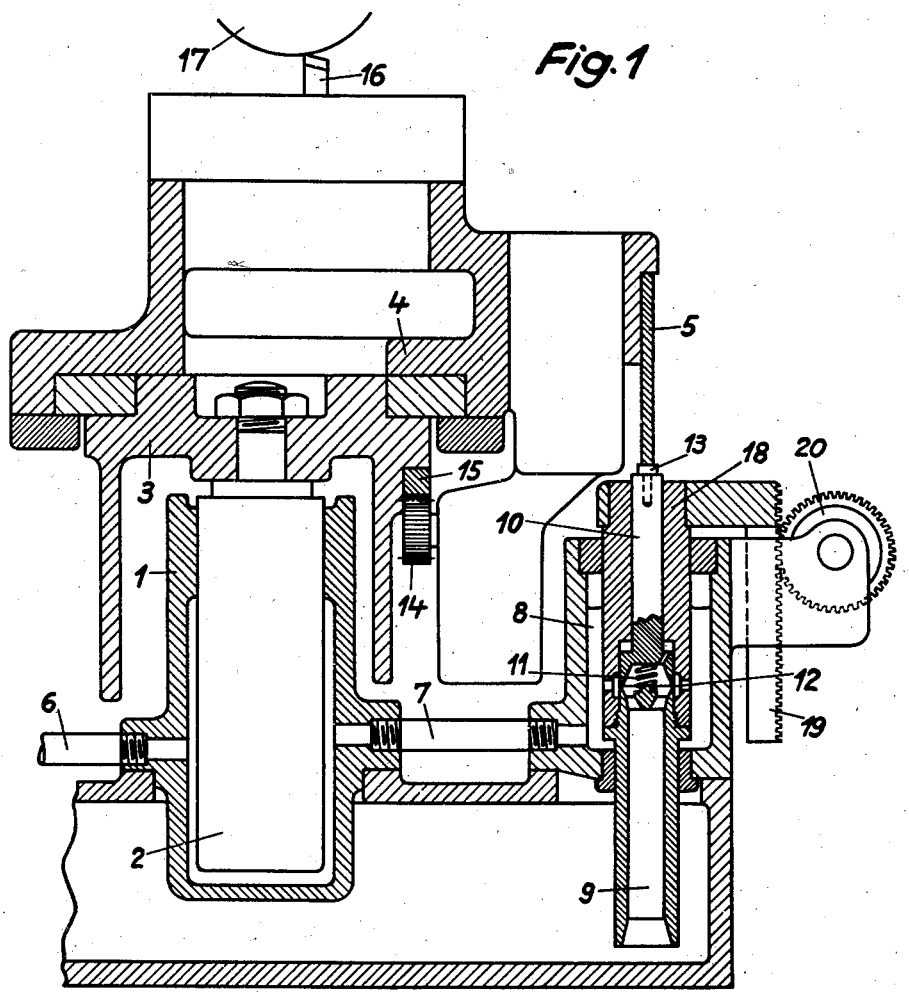
Fig. 1 is a section of an example of construction of a copying device of a machine tool according to the invention.

In Fig. 1, 1 is the cylinder, connected to the framework, 2 the piston and 3 the bracket moved by the piston, on which there slides a tool slide 4 carrying the templet 5. The admission of oil under pressure into the cylinder 1 is effected through the pipe 6 by a constant delivery pump which may be a toothed wheel pump. The oil under pressure passes through the pipe 7 into the control cylinder space 8, from which when the piston is stationary, as much oil must flow through the gap 12 into the pipe 9, as is supplied by the pump. For this purpose the templet must press the valve rod 10 against the action of the spring 11.

Figure 2:
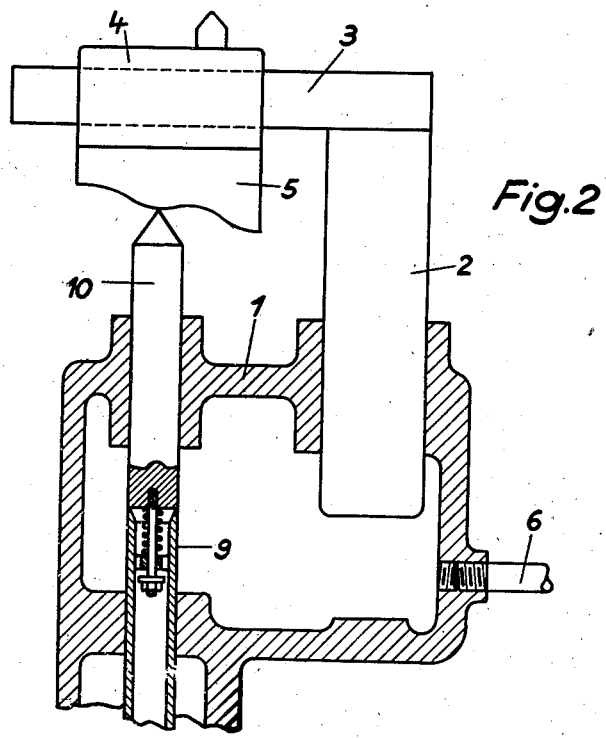
Fig. 2 shows diagrammatically the co-operation of the various parts.

In Fig. 2 there is shown diagrammatically the co-operation of the separate parts 1 to 5 with the valve rod 10. When the pressure of the templet 5 on the valve rod 10 ceases, then the valve rod is pressed upwardly by the spring 11 (Fig. 1) so that more oil can flow out through the gap 12 than flows in, whereby the bracket 3, together with the tool slide 4, descends. This takes place until the templet presses against the feeler pin 13 so strongly that the valve rod 10 closes the gap 12 to such an extent that the inflow and outflow of oil under pressure becomes equal. In this manner the pressure in the cylinder is always maintained at such a degree that the hydraulic pressure acting on the piston 2 maintains equilibrium with the load acting thereon.

When the tool slide 4 moves on the bracket 3, by the rolling of the pinion 14 on the rack 15, whereby the pinion 14 is driven mechanically by the slide, the bracket 3, together with the slide 4, will additionally move up and down in accordance with the shape of the templet 5. When in accordance with the example of the construction of the machine as turning lathe, a tool is secured at 16, the tool, during the longitudinal movement of the slide 4 will operate upon a rotating workpiece, located at 17, in accordance with the shape of the templet.

For adjusting the exact turning diameter the valve 18, which is stationary during copying, is adjusted in height. In Fig. 1 a rack 19, is provided for example for this purpose, with which engages a toothed wheel 20. The movement of the toothed wheel 20 may be effected either manually or mechanically from the slide drive.

As shown in Fig. 1 there is obtained on the one hand, by the arrangement according to the invention, according to which the movable rod, actuated by the templet, is moved relatively to a valve which is stationary relative to the framework during copying and which, relatively to the tool, is in the same side of the machine as the moved templet and the actuated slide, that between the templet and valve any complicated transmission mechanism is eliminated and the use of a screw spindle, between the piston and bracket, for additional adjustment of the slide can be omitted as the adjustment of the valve can be effected by the wheel 20 both by hand and also mechanically from the slide drive. The templet may also be located at a distance from the position of the tool so that it is not liable to be soiled by shavings. Further, as the valve is located on the same side as the piston to be actuated the pipes between the valve and pressure cylinder are very short, which is of considerable importance in obtaining greater accuracy in copying.

Figure 3:
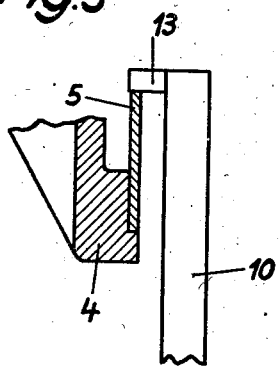
Fig. 3 shows a portion of a copying device in section.
Figure 4:
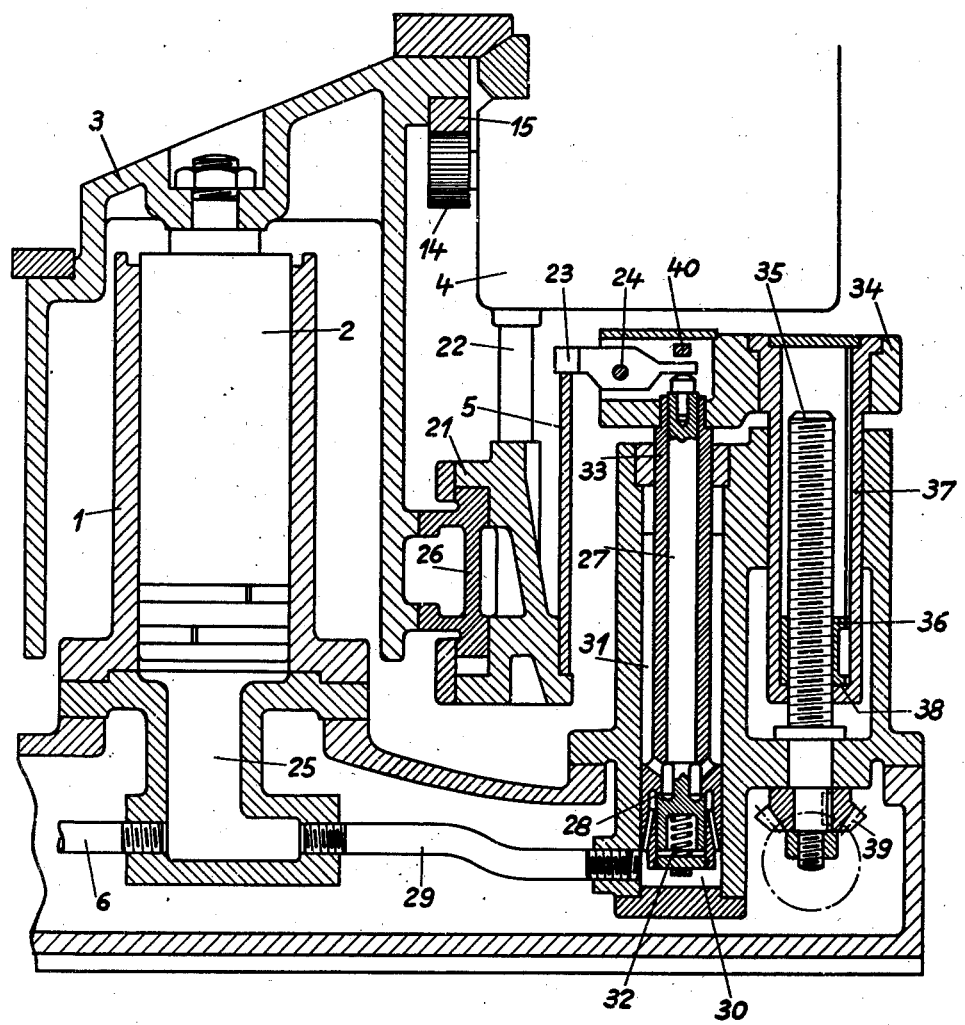
Fig. 4 is a section of another form of construction according to the invention.

A further feature which improves previous constructions resides therein that the templet and the rod actuated thereby are arranged side by side. By reason of the fact that with such an arrangement there is avoided the use of intermediate members, such as toothed wheels and so forth, which disturb the accuracy, the copying mechanism can be constructed of lesser height. Fig. 3 shows by way of example an arrangement of this character. In this case the arrangement of the templet according to the invention is such that the rod located adjacent thereto and actuated thereby is so arranged in the machine that the work-piece and tool can be separated from one another without it being necessary to move the valve. Fig. 4 shows by way of example a form of construction of a machine of this character.

Figure 5:
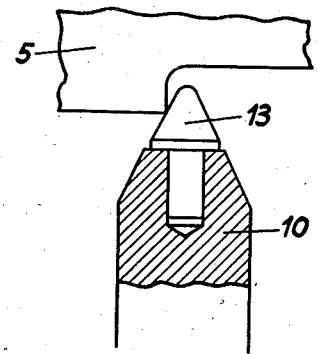
Fig. 5 shows a portion of a copying device.

As a further idea of the invention it is also necessary to mention the copying lever 23 shown in Fig. 4. On the one hand it enables the templet to be arranged adjacent the valve rod without in this case, as in Fig. 3, an eccentric force being exerted on the valve rod, and on the other hand the lateral pressure otherwise exerted by the templet on the feeler pin is taken up by the lever mounting 24, which may preferably be constructed as a point bearing. These lateral forces of the templet on the copying projection may become extremely great when the templet has sharp edges (Fig. 5). By the provision of the copying lever 23 (Fig. 4), there is obtained that on the valve rod 27 there is only exerted an axial pressure which, in comparison with Fig. 5, considerably assists in improving the accuracy of copying. A further advantage of the copying lever resides in the fact that between the copying projection and the valve rod there is fitted a movable member which can be actuated by a pressure member 40 as hereinafter described.

In Fig. 4 there is shown, relatively to Fig. 1 another arrangement of the copying device according to the invention, as in this case the templet 5 is mounted on a separate slide, which is driven by the tool slide 4 by means of a pin 22. In this manner there is obtained that the wear of the guide of the tool slide does not influence the accuracy of the templet movement.

By the particular arrangement of the valve rod and valve casing there is obtained that by the additional movement of the valve plate, the feeler pin or valve rod 10 (Figs. 1 and 4) does not receive any variation as regards its position. This is obtained by reason of the fact that for example in Fig. 1, the seating 18 of the feeler pin rod 10 is rigidly connected to the part 9 carrying the valve plate. If this were not the case and only the valve tube 9 were moved, whereas the feeler pin rod was mounted in a stationary casing, then for different positions of the valve the feeler pin rod would assume different positions relatively to its seating and thus it would not operate equally well in all positions. The feeler pin rod would then in many positions project further from its seating. Fig. 2 shows a form of construction of this character.

As a separate idea of the invention may be mentioned the fact that the adjustment of the valve 33 in Fig. 4 may be effected without it being necessary for this purpose to move the valve casing with the oil supply member 29 and the outflow member 31. The oil pipes may therefore remain secured to the framework even when the valve is adjusted in position.

In Fig. 4 the oil under pressure comes from the constantly operating oil pump at 6 into the oil chamber 25 and presses the piston 2 upwardly in the cylinder 1. The bracket 3, rigidly connected to the piston, is thus also moved upwardly and through the templet guide 26 moves with it the templet slide 21 and the templet 5. During the upward movement of the bracket the templet 5 presses against the copying lever 23 which, by turning on the pivot 24 presses against the valve rod 27. The valve is thus opened at 28 so that the oil under pressure flowing at 29 into the cylinder chamber 30 of the valve can flow through 28 into the outflow at 31, whereby the pressure is again reduced. When the pressure of the templet 5 on the copying lever 23 ceases, the spring 32 closes the gap at 28, whereby the pressure in the oil pipe at 25 again rises and the bracket is raised.

The valve plate, which is stationary during copying, is rigidly connected to the valve rod guide 33 and can be moved together with the copying lever 23 by means of the knob 34. The adjustment of the position of the knob 34 is effected by the screw spindle 35 and nut 36 which can be adjusted in height. The oil pressure at 30 causes the knob 34 always to bear tightly by means of the sleeve 37 against the nut 36 at 38. The turning of the screw spindle 35 is effected by a bevel wheel 39 and can there be driven both mechanically and manually. The manual adjustment serves in the first instance for adjusting the dimensions of the work-piece to be produced, whilst the mechanical drive, produces an automatic transmission feed independently of the copying. According to the invention no separate gear is provided for the adjustment of the valve which is stationary during copying, but the drive of the copying slide is used for this purpose.

The hydraulic copying devices according to the invention, shown in the figures, are shown only by way of example on a vertical copying machine. It will be understood that they can be used on any other copying machine. In the case of the vertical copying machine there is the simplification that the counter pressure is produced by the weight of the bracket. In the case of horizontally operating copying machines, the force acting against the pressure piston can be produced in any suitable manner by mechanical, hydraulic or pneumatic auxiliary means.

An additional rapid adjustment, for example for withdrawing the tool from the work-piece, can be obtained by lowering the bracket, in that the valve rod actuated by the templet, when the fixed valve is stationary, besides being moved by the templet may be moved by additional means. In the form of construction in Fig. 4 a lowering of this character is produced in that a lever 40 allows the valve rod 27 to press against the spring force of 32. As the position of the valve plate which is stationary during copying, determines the exact milling or turning diameter of the workpiece it is possible by means of the additional influencing of the valve guide rod, to withdraw the tool rapidly from the work-piece, without interfering with the adjustment for the accurate dimensioning of the work-piece. The lever 40 may be connected to actuating members, which may be actuated mechanically, manually or automatically by stops.

Fig. 6 shows the arrangement of the pivotally mounted lever 23, between the templet and the actuating rod, in another arrangement of the templet and valve rod. In this case 40 again indicates the lever which serves for the rapid adjustment of the bracket. By the arrangement of the intermediate lever 23 in Fig. 6 there is obtained, as in the construction in Fig. 4, that the lateral pressure exerted by the templet 5 (Fig. 5) on the copying projection, is not transmitted to the further rod but is preferably taken up by the bearing 24 (Fig. 6) of the lever 23.

The lever 40, Fig. 7, is raised by the spring 41 from the copying lever 23. The lever 40 pivots about the pivot 42 and is hingedly connected to the rack 43. With the rack 43 engages a worm wheel 44 mounted in an angle member 45, Fig. 8. The angle member 45 is rigidly connected to the bracket. The worm wheel 44 is connected both to a hand-piece 46 as also through a second worm wheel 47 to a stop rod 48. By means of the hand-piece 46 it is possible to press against the feeler lever 23 through the medium of the worm wheel 44, rack 43 and lever 40. In this manner the same action occurs, as if the templet moved the feeler lever, that is to say the bracket descends. There thus also descends the angle piece 45, secured to the bracket, so that the worm wheel 44 rolls on the rack 43. The torque to be exerted by the hand-piece 46 must act in the direction of movement during the descent so that when releasing the hand-piece the bracket again immediately ascends. By turning the hand-piece 46 it is thus possible to influence both the descending and the ascending velocity. When the hand-piece is held tightly, or any turning movement of the worm wheel 44 is prevented by locking the stop rod 48 by means of a screw 49, the feeler lever 23 is actuated by the rack in the same manner as by the templet; during the descent of the bracket the feeler lever 23 is released, during the ascent of the bracket it is pressed. When the stop rod is not locked, but only its return movement is prevented by the stop 50, the bracket is held at a constant height without the action of the templet for further downward movement being rendered impossible.

In Fig. 9 is shown the change speed gear for the forward drive. The motor 51 drives through toothed wheel gearing the shaft 52 from which there can be driven the shaft 53 either directly through a dog clutch or through an intermediate shaft 54.

Figure 10:
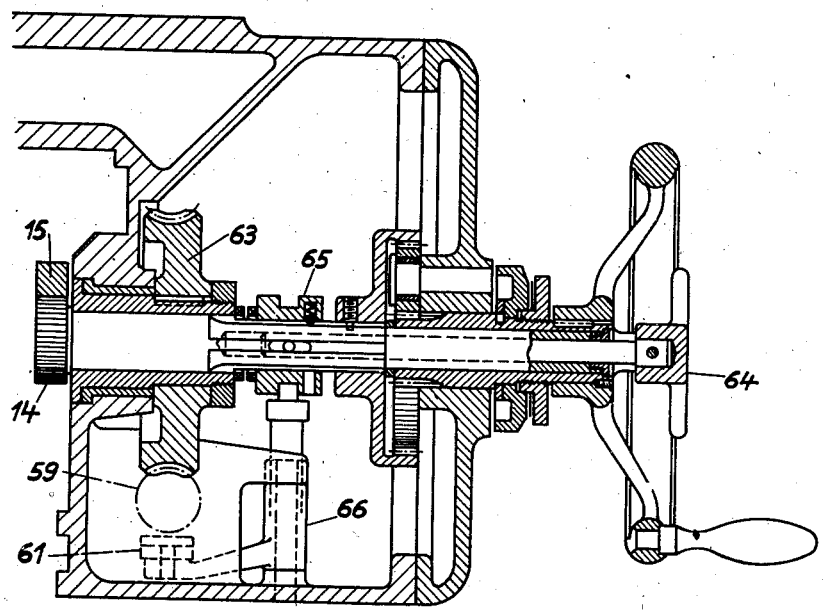
Fig. 10 shows the drive of a copying slide and the reversal by a hydraulic automatic operation.

From the shaft 53 the drive passes to the shaft 55 through a moving block and from here selectively through two moving elements to the shaft 56. The shaft 57 can be driven backwardly or forwardly through a reversing gear in that the drive from the shaft 56 takes place directly or through an intermediate wheel 58. From the shaft 57 the drive passes through a worm 59 for driving the longitudinal slide or through a clutch 61 to the driving shaft 60 which moves the hydraulic valve. The shaft 60 can also be turned by the hand wheel 62. The worm 59 engages with a worm wheel 63 (Fig. 10) which can be coupled to a pinion 14 through a clutch 65. The pinion 14 engages with a rack 15 and moves the slide 4 (Figs. 1 and 4). The movement of the dog clutches 61 and 65 (Fig. 10) is effected by a hand wheel 64. In the mid-position of the hand wheel 64 both clutches are disengaged.

Figure 11:
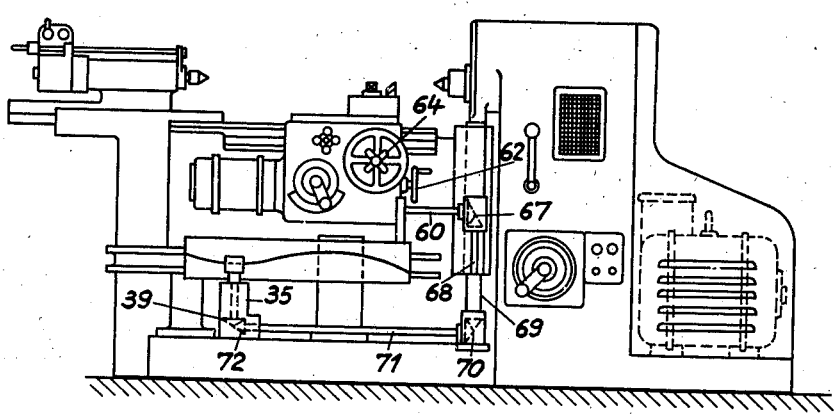
Fig. 11 shows an elevation of an example of construction of a machine tool according to the invention.

From the shaft 60 the drive passes through bevel wheels 67 (Fig. 11) to a telescopic shaft 68 and 69 and from here through bevel wheels 70 to the lower shaft 71 from which there is driven, through a bevel wheel 72 a bevel wheel 39 keyed to the screw spindle 35. By turning the screw spindle 35 the nut 36 is adjusted (Fig. 4), thus determining the position of height of the valve 33 which is stationary during the copying operation.

By adjusting the height of the valve 33 it is possible to adjust the dimensions of the work-piece shaped by the templet. It is also possible to produce at right angles to the movement of the templet slide a feed when the templet is stationary. In general the hand wheel 62 (Fig. 9) serves to adjust the dimensions of the work-piece and the mechanical drive through the clutch 61 for the automatic vertical control of the copying slide.

I claim:

1. In a machine tool with a hydraulic copying device, in which the work is relatively stationarily located and in which the tool is longitudinally movable, means to control said tool for transverse movement during its longitudinal movement, said means including a cylinder and a piston, and a valve for controlling the hydraulic pressure oil to permit more or less passage of the oil, said valve being stationarily held with respect to the base of the machine during the transverse movement of the tool, said valve, as viewed from the work, being located in the direction of the transverse movement of the tool as controlled by the pattern and being disposed, with the pattern, on the same side of the machine as said cylinder and piston.

2. A machine tool according to claim 1, wherein said rod is disposed out of alignment with the pattern but adjacent thereto.

3. A machine tool according to claim 1, including a freely pivoted lever, and a projection on said lever, said projection co-operating with said templet.

4. A machine tool according to claim 1, including a separate slide on which said templet is mounted.

5. A machine tool according to claim 1, wherein said valve, is mounted for adjustment, a valve casing in which said valve is mounted and inflow and outflow pipes for oil connected to said valve casing, the arrangement being such that adjustment of the valve, for the purpose of adjusting said slide, can be effected without moving the valve casing and the inflow and outflow pipes connected thereto.

6. A machine tool according to claim 1, including a feeler finger, a carrier for said finger, said carrier being operatively connected to said valve, a valve casing in which said valve is adjustably mounted and inflow and outflow pipes for oil connected to said valve casing, the arrangement being such that adjustment of the valve, for the purpose of adjustment of said slide and said carrier, can be effected without moving the valve casing and the inflow and outflow pipes connected thereto.

7. A machine tool according to claim 1, wherein said valve is adjustable both manually and mechanically.

8. A machine tool according to claim 1, including feeding mechanism for said slide, said feeding mechanism being operatively associated with said valve for the purpose of adjusting the same mechanically.

9. A machine tool according to claim 1, including mechanism operatively assocoiated with said valve rod, a mounting for said mechanism, said mechanism carrying out a movement relatively to its mounting which corresponds with the transverse actuation of said slide, the said slide being thereby actuated independently of the templet when the valve is stationary.

10. A machine tool according to claim 1, including mechanism operatively associated with said slide, said mechanism serving to adjust said slide relatively to said framework and being operable manually and mechanically.

11. A machine tool according to claim 1, including mechanism operatively associated with said slide, said mechanism serving to adjust said slide relatively to said framework, the actuation produced by the mechanism on the slide being such that the templet can come into operation automatically.

12. A machine tool according to claim 1, including mechanism operatively associated with said valve rod, said valve rod being located adjacent said templet, said mechanism being disengaged from said valve rod during copying, mounting for said mechanism, and a guide for said valve, the arrangement being such that during copying the force for producing the movement of the mechanism relatively to its mounting is applied by the guide for the valve rod.

HEINRICH BRANDENBERGER.